(12) United States Patent
Stockhammer

(10) Patent No.: US 11,617,019 B2
(45) Date of Patent: Mar. 28, 2023

(54) RETRIEVING AND ACCESSING SEGMENT CHUNKS FOR MEDIA STREAMING

(71) Applicant: QUALCOMM Incorporated, San Diego, CA (US)

(72) Inventor: Thomas Stockhammer, Bergen (DE)

(73) Assignee: QUALCOMM Incorporated, San Diego, CA (US)

( * ) Notice: Subject to any disclaimer, the term of this patent is extended or adjusted under 35 U.S.C. 154(b) by 10 days.

(21) Appl. No.: 15/661,789

(22) Filed: Jul. 27, 2017

(65) Prior Publication Data

US 2018/0035176 A1    Feb. 1, 2018

Related U.S. Application Data

(60) Provisional application No. 62/368,099, filed on Jul. 28, 2016.

(51) Int. Cl.
| | |
|---|---|
| H04N 21/845 | (2011.01) |
| H04N 21/858 | (2011.01) |
| H04N 21/2343 | (2011.01) |
| H04N 21/262 | (2011.01) |
| H04L 65/61 | (2022.01) |
| H04L 65/75 | (2022.01) |
| H04L 67/02 | (2022.01) |

(Continued)

(52) U.S. Cl.
CPC ......... *H04N 21/8456* (2013.01); *H04L 65/61* (2022.05); *H04L 65/762* (2022.05); *H04L 67/02* (2013.01); *H04L 67/146* (2013.01); *H04N 21/23439* (2013.01); *H04N 21/26258* (2013.01); *H04N 21/6377* (2013.01); *H04N 21/8455* (2013.01); *H04N 21/8586* (2013.01)

(58) Field of Classification Search
CPC ............ H04N 21/8456; H04L 65/4069; H04L 65/602; H04L 67/146
USPC ........................................................ 709/219
See application file for complete search history.

(56) References Cited

U.S. PATENT DOCUMENTS

| | | |
|---|---|---|
| 9,357,275 B2 | 5/2016 | Nagaraj et al. |
| 2011/0307946 A1 | 12/2011 | Hilerio et al. |
| 2013/0246643 A1 | 9/2013 | Luby et al. |

(Continued)

FOREIGN PATENT DOCUMENTS

| | | |
|---|---|---|
| WO | 2013036450 | 3/2013 |
| WO | 2013163448 A1 | 10/2013 |
| WO | 2015115171 A1 | 8/2015 |

OTHER PUBLICATIONS

International Search Report and Written Opinion—PCT/US2017/044353—ISA/EPO—dated Sep. 25, 2017.

(Continued)

*Primary Examiner* — Meng Vang
(74) *Attorney, Agent, or Firm* — Shumaker & Sieffert, P.A.

(57) ABSTRACT

An example device for retrieving media data includes one or more processors implemented in circuitry and configured to receive a manifest file including data indicating a number of segment chunks available for a segment of a representation of media data, the segment comprising an independently retrievable media file having a unique uniform resource locator (URL), determine an identifier for one of the chunks using the data indicating the number of chunks available for the segment, and send a request specifying the identifier for the one of the chunks to a server device.

57 Claims, 10 Drawing Sheets

(51) Int. Cl.
  *H04L 67/146* (2022.01)
  *H04N 21/6377* (2011.01)

(56) References Cited

U.S. PATENT DOCUMENTS

| | | | | | |
|---|---|---|---|---|---|
| 2014/0019633 | A1* | 1/2014 | Zhang | H04L 65/601 | 709/231 |
| 2014/0149210 | A1* | 5/2014 | Ma | G06Q 30/0251 | 705/14.49 |
| 2014/0279852 | A1* | 9/2014 | Chen | G06F 16/43 | 707/609 |
| 2014/0282792 | A1* | 9/2014 | Bao | H04N 21/44004 | 725/116 |
| 2015/0074232 | A1* | 3/2015 | Phillips | H04L 65/604 | 709/219 |
| 2015/0286369 | A1* | 10/2015 | Pontual | G06F 3/04842 | 715/719 |
| 2016/0198012 | A1* | 7/2016 | Fablet | H04L 67/26 | 709/231 |
| 2017/0180825 | A1* | 6/2017 | Lacivita | H04L 67/06 | |

OTHER PUBLICATIONS

International Standard., "Information Technology—Dynamic Adaptive Streaming over HTTP (DASH)—Part 1: Media Presentation Description and Segment Formats", MPEG Meeting; Jan. 16, 2017-Jan. 20, 2017; Geneva; (Motion Picture Expert Group or ISO/IEC JTC1/SC29/WG11), No. N16666, ISO/IEC 23009-1, Third Edition, XP030023329, Mar. 28, 2017, pp. 1-208.
International Standard., "Information Technology—Dynamic Adaptive Streaming over HTTP (DASH)—Part 1: Media Presentation Description and Segment Formats", MPEG Meeting;Oct. 19, 2015-Oct. 23, 2015; Geneva; (Motion Picture Expert Group or ISO/IEC JTC1/SC29/WG11), No. N15686, ISO/IEC 23009-1, Third Edition, XP030022374, Dec. 8, 2015, pp. 1-184.
Stockhammer T., "CE-SISSI Report", Qualcomm Incorporated (CE Coordinator, ) 112. MPEG Meeting; Jun. 22, 2015-Jun. 26, 2015; Warsaw; (Motion Picture Expert Group or ISO/IEC JTC1/SC29/WG11), No. m36597, Jun. 21, 2015 (Jun. 21, 2015), XP030064965, pp. 1-20.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Fielding, et al., "Hypertext Transfer Protocol—HTTP/1.1," Network Working Group, RFC 2616, Jun. 1999, 148 pp.
Paila, et al., "FLUTE-File Delivery over Unidirectional Transport," Internet Engineering Task Force (IETF), RFC 6726, Nov. 2012, 46 pp.
Berners-Lee, et al., "Uniform Resource Identifier (URI): Generic Syntax," Network Working Group, RFC 3986, Jan. 2005, 53 pp.
"ATSC Candidate Standard: Signaling, Delivery, Synchronization, and Error Protection (A/331)," Doc. S33-174r1, Advanced Television Systems Committee, Jan. 5, 2016, 131 pp.
International Preliminary Report on Patentability—PCT/US2017/044353, The International Bureau of WIPO—Geneva, Switzerland, dated Sep. 25, 2018.
Response to Written Opinion from International Application No. PCT/US2017/044353, dated May 25, 2018, 4 pp.
Second Written Opinion from International Application No. PCT/US2017/044353, dated Jun. 15, 2018, 8 pp.
Taiwan Search Report—TW106125594—TIPO—dated Sep. 10, 2021.

* cited by examiner

RETRIEVING AND ACCESSING SEGMENT CHUNKS FOR MEDIA STREAMING

This application claims the benefit of U.S. Provisional Application No. 62/368,099, filed Jul. 28, 2016, the entire contents of which are hereby incorporated by reference.

TECHNICAL FIELD

This disclosure relates to transport of encoded media data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), ITU-T H.265 (also referred to High Efficiency Video Coding (HEVC)) and extensions of such standards, to transmit and receive digital video information more efficiently.

After video data has been encoded, the video data may be packetized for transmission or storage. The video data may be assembled into a video file conforming to any of a variety of standards, such as the International Organization for Standardization (ISO) base media file format and extensions thereof, such as AVC.

SUMMARY

In general, this disclosure describes techniques for using segment chunks. The techniques of this disclosure include, for example, signaling a number of chunks available for a full segment. The techniques of this disclosure also include addressing schemes (e.g., naming schemes) for addressing the chunks, e.g., to request the chunks for retrieval.

In one example, a method of retrieving media data includes receiving a manifest file including data indicating a number of segment chunks available for a segment of a representation of media data, the segment comprising an independently retrievable media file having a unique uniform resource locator (URL), determining an identifier for one of the chunks using the data indicating the number of chunks available for the segment, and sending a request specifying the identifier for the one of the chunks to a server device.

In another example, a device for retrieving media data includes one or more processors implemented in circuitry and configured to receive a manifest file including data indicating a number of segment chunks available for a segment of a representation of media data, the segment comprising an independently retrievable media file having a unique uniform resource locator (URL), determine an identifier for one of the chunks using the data indicating the number of chunks available for the segment, and send a request specifying the identifier for the one of the chunks to a server device.

In another example, a device for retrieving media data includes means for receiving a manifest file including data indicating a number of segment chunks available for a segment of a representation of media data, the segment comprising an independently retrievable media file having a unique uniform resource locator (URL), means for determining an identifier for one of the chunks using the data indicating the number of chunks available for the segment, and means for sending a request specifying the identifier for the one of the chunks to a server device.

In another example, a computer-readable storage medium has stored thereon instructions that, when executed, cause a processor to receive a manifest file including data indicating a number of segment chunks available for a segment of a representation of media data, the segment comprising an independently retrievable media file having a unique uniform resource locator (URL), determine an identifier for one of the chunks using the data indicating the number of chunks available for the segment, and send a request specifying the identifier for the one of the chunks to a server device.

The details of one or more examples are set forth in the accompanying drawings and the description below. Other features, objects, and advantages will be apparent from the description and drawings, and from the claims.

DETAILED DESCRIPTION

Figure 1:
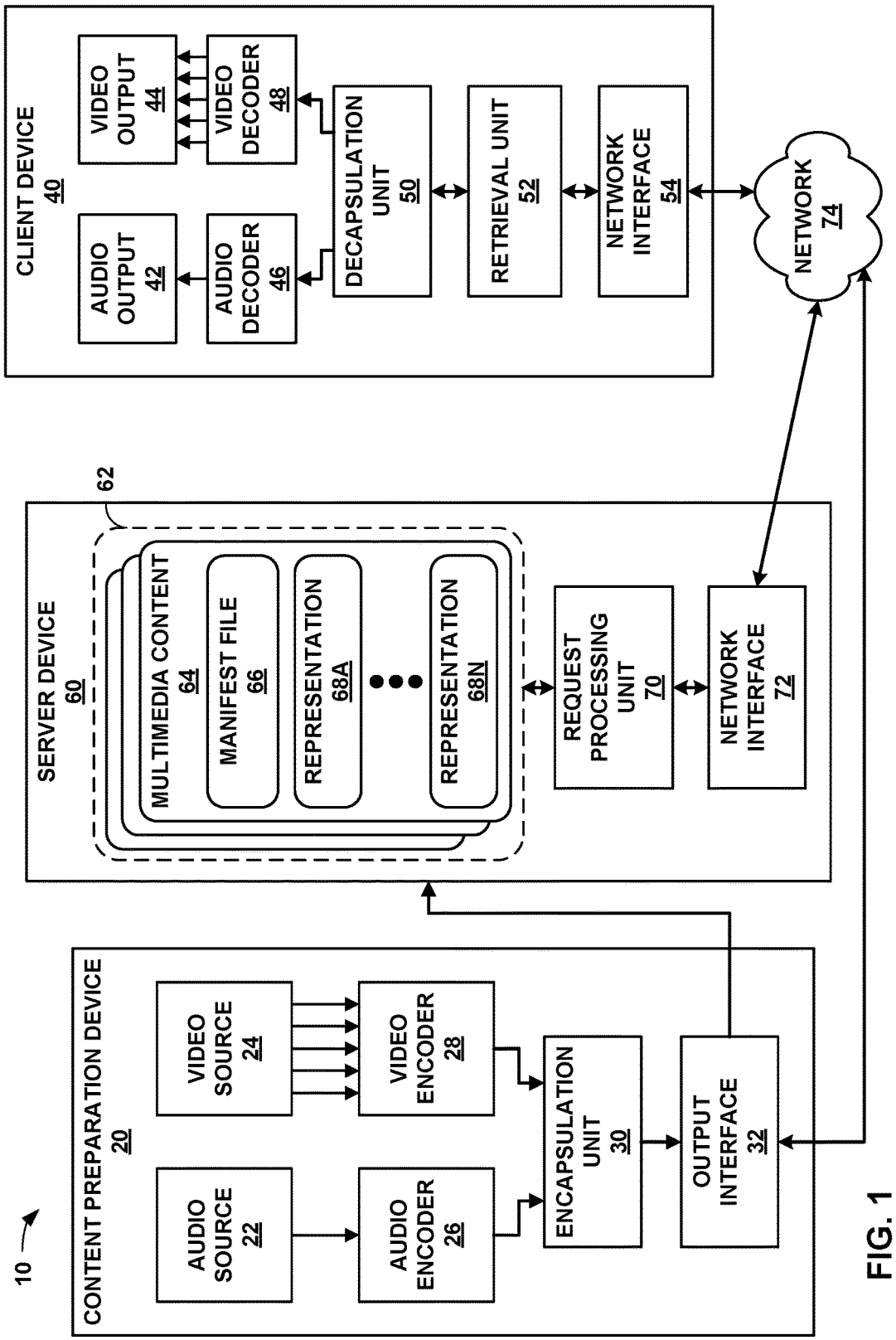
FIG. 1 is a block diagram illustrating an example system that implements techniques for streaming media data over a network.

In general, this disclosure describes techniques for using sequences of segments, e.g., segments including data for relatively short playback durations compared to conventional segments. That is, one or more segments may lack a random access point (RAP). Thus, rather than a single segment having data for a playback duration of N seconds (or other time unit, such as microseconds, milliseconds, or the like), the single segment having a RAP and being associated with a segment availability start time (SAST), a plurality of segments may be provided having data for the playback duration of N seconds, only one of the plurality of segments including a RAP, and each of the plurality of segments being associated with respective SASTs. By using such shorter segments, playback can begin faster than using conventional, longer segments.

Various options for providing a solution using shorter segments may be used, alone or in combination. For example, accurate durations for segment timelines for segment chunks may be advertised. However, advertising accurate durations may be overkill, and may require many manifest file (e.g., media presentation description (MPD)) updates. A hierarchical addressing scheme may be used. However, it is uncertain whether there is sufficient time to use the hierarchical addressing scheme.

The techniques of this disclosure may be applied to media files (such as video files) conforming to media data encapsulated according to any of ISO base media file format, Scalable Video Coding (SVC) file format, Advanced Video Coding (AVC) file format, Third Generation Partnership Project (3GPP) file format, and/or Multiview Video Coding (MVC) file format, or other similar video file formats.

In HTTP streaming, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more Periods. Each period may extend until the start of the next Period, or until the end of the media presentation, in the case of the last period. Each period may contain one or more representations for the same media content. A representation may be one of a number of alternative encoded versions of audio, video, timed text, or other such data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC and the upcoming High Efficiency Video Coding (HEVC) standard, define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. In the example of H.264/AVC (Advanced Video Coding), coded video segments are organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

In accordance with the techniques of this disclosure, manifest file 66 may be modified to include an attribute signaling a number of "chunks" for which segments of any or all of representations 68 are available. For example, manifest file 66 may represent an MPD including an "@k" attribute as discussed in greater detail below. Furthermore, retrieval unit 52 and/or request processing unit 70 may be configured according to techniques of this disclosure for addressing segment chunks. In particular, the addressing scheme may include, for example, the use of a simple numbering template ("$Number$") for chunks of segments, or a hierarchical addressing scheme including at least two parts. The first part may correspond to full segment numbers for corresponding segments or timing information of the corresponding segments. The timing information may indicate, for example, a playback time at which the corresponding segment is to begin being played. The second part may correspond to ordinal numeric identifiers of the chunks. For example, the hierarchical addressing scheme may use a "$Number$.$ChunkNumber$" format or a "$Time$.$ChunkNumber$" format.

In this manner, client device 40 represents an example of a device for retrieving media data that includes one or more processors implemented in circuitry and configured to receive a manifest file including data indicating a number of segment chunks available for a segment of a representation of media data, the segment comprising an independently retrievable media file having a unique uniform resource locator (URL), determine an identifier for one of the chunks using the data indicating the number of chunks available for the segment, and send a request specifying the identifier for the one of the chunks to a server device.

Figure 2:
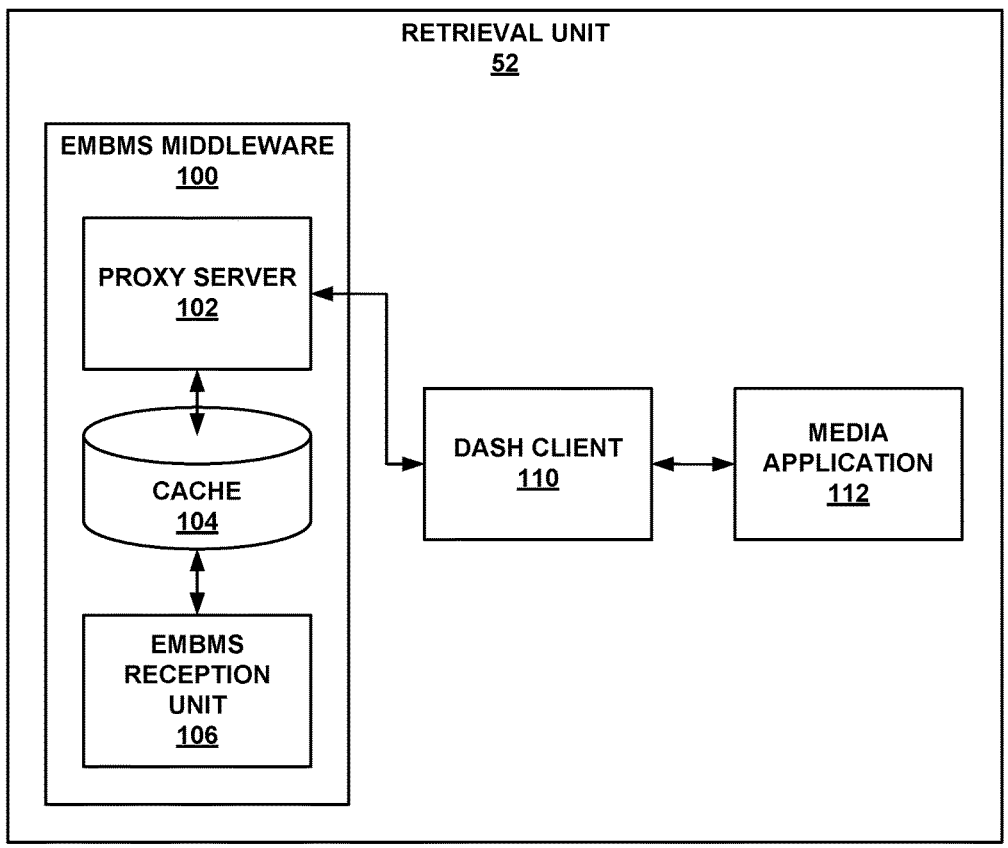
FIG. 2 is a block diagram illustrating an example set of components of the retrieval unit of FIG. 1 in greater detail.

FIG. 2 is a block diagram illustrating an example set of components of retrieval unit 52 of FIG. 1 in greater detail.

In this example, retrieval unit 52 includes eMBMS middleware unit 100, DASH client 110, and media application 112.

In this example, eMBMS middleware unit 100 further includes eMBMS reception unit 106, cache 104, and server unit 102. In this example, eMBMS reception unit 106 is configured to receive data via eMBMS, e.g., according to File Delivery over Unidirectional Transport (FLUTE), described in T. Paila et al., "FLUTE—File Delivery over Unidirectional Transport," Network Working Group, RFC 6726, November 2012, available at http://tools.ietf.org/html/rfc6726. That is, eMBMS reception unit 106 may receive files via broadcast from, e.g., server device 60, which may act as a BM-SC.

As eMBMS middleware unit 100 receives data for files, eMBMS middleware unit may store the received data in cache 104. Cache 104 may comprise a computer-readable storage medium, such as flash memory, a hard disk, RAM, or any other suitable storage medium.

Local server unit 102 may act as a server for DASH client 110. For example, local server unit 102 may provide a MPD file or other manifest file to DASH client 110. Local server unit 102 may advertise availability times for segments in the MPD file, as well as hyperlinks from which the segments can be retrieved. These hyperlinks may include a localhost address prefix corresponding to client device 40 (e.g., 127.0.0.1 for IPv4). In this manner, DASH client 110 may request segments from local server unit 102 using HTTP GET or partial GET requests. For example, for a segment available from link http://127.0.0.1/rep1/seg3, DASH client 110 may construct an HTTP GET request that includes a request for http://127.0.0.1/rep1/seg3, and submit the request to local server unit 102. Local server unit 102 may retrieve requested data from cache 104 and provide the data to DASH client 110 in response to such requests.

DASH client 110 may be configured in accordance with the techniques of this disclosure to request segments from proxy server 102 using the naming conventions of this disclosure. Likewise, DASH client 110 may be configured to determine names of segments using a manifest file received from proxy server 102, where the manifest file may signal a number of "chunks" available for each full segment, e.g., in the form of an "@k" attribute as discussed in greater detail below. Similarly, proxy server 102 may also be configured according to the techniques of this disclosure.

For example, DASH client 110 and proxy server 102 may be configured to name segment chunks using a simple $Number$ template. Alternatively, DASH client 110 and proxy server 102 may be configured to name segment chunks according to a hierarchical naming (or addressing) scheme, which may include two parts. The first part may correspond to full segment numbers for corresponding segments or timing information of the corresponding segments. The timing information may indicate, for example, a playback time at which the corresponding segment is to begin being played. The second part may correspond to an ordinal identifier for a chunk of a particular full segment.

Figure 3:
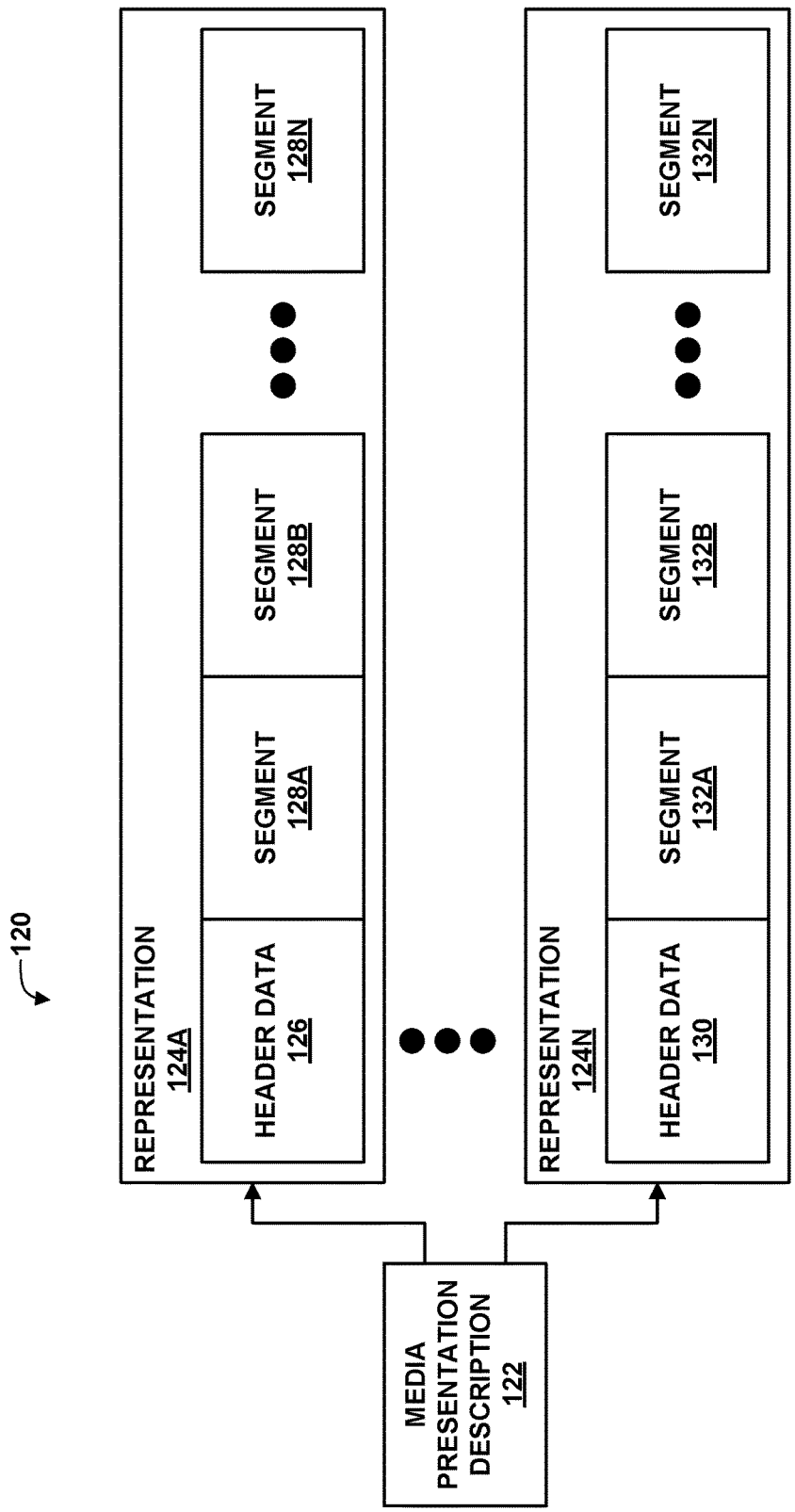
FIG. 3 is a conceptual diagram illustrating elements of example multimedia content.

FIG. 3 is a conceptual diagram illustrating elements of example multimedia content 120. Multimedia content 120 may correspond to multimedia content 64 (FIG. 1), or another multimedia content stored in storage medium 62. In the example of FIG. 3, multimedia content 120 includes media presentation description (MPD) 122 and a plurality of representations 124A-124N (representations 124). Representation 124A includes optional header data 126 and segments 128A-128N (segments 128), while representation 124N includes optional header data 130 and segments 132A-132N (segments 132). The letter N is used to designate the last movie fragment in each of representations 124 as a matter of convenience. In some examples, there may be different numbers of movie fragments between representations 124.

MPD 122 may comprise a data structure separate from representations 124. MPD 122 may correspond to manifest file 66 of FIG. 1. Likewise, representations 124 may correspond to representations 68 of FIG. 2. In general, MPD 122 may include data that generally describes characteristics of representations 124, such as coding and rendering characteristics, adaptation sets, a profile to which MPD 122 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 126, when present, may describe characteristics of segments 128, e.g., temporal locations of random access points (RAPs, also referred to as stream access points (SAPs)), which of segments 128 includes random access points, byte offsets to random access points within segments 128, uniform resource locators (URLs) of segments 128, or other aspects of segments 128. Header data 130, when present, may describe similar characteristics for segments 132. Additionally or alternatively, such characteristics may be fully included within MPD 122.

Segments 128, 132 include one or more coded video samples, each of which may include frames or slices of video data. Each of the coded video samples of segments 128 may have similar characteristics, e.g., height, width, and bandwidth requirements. Such characteristics may be described by data of MPD 122, though such data is not illustrated in the example of FIG. 3. MPD 122 may include characteristics as described by the 3GPP Specification, with the addition of any or all of the signaled information described in this disclosure.

Each of segments 128, 132 may be associated with a unique uniform resource locator (URL). Thus, each of segments 128, 132 may be independently retrievable using a streaming network protocol, such as DASH. In this manner, a destination device, such as client device 40, may use an HTTP GET request to retrieve segments 128 or 132. In some examples, client device 40 may use HTTP partial GET requests to retrieve specific byte ranges of segments 128 or 132.

In accordance with the techniques of this disclosure, MPD 122 may include an attribute signaling a number of segment chunks available for a particular segment. For example, MPD 122 may include an "@k" element, as discussed in greater detail below. MPD 122 may further signal a naming scheme (or addressing scheme) to be used to address segment chunks. Such naming/addressing scheme may be based on ordinal information and/or timing information, as discussed in greater detail below.

Figure 4:
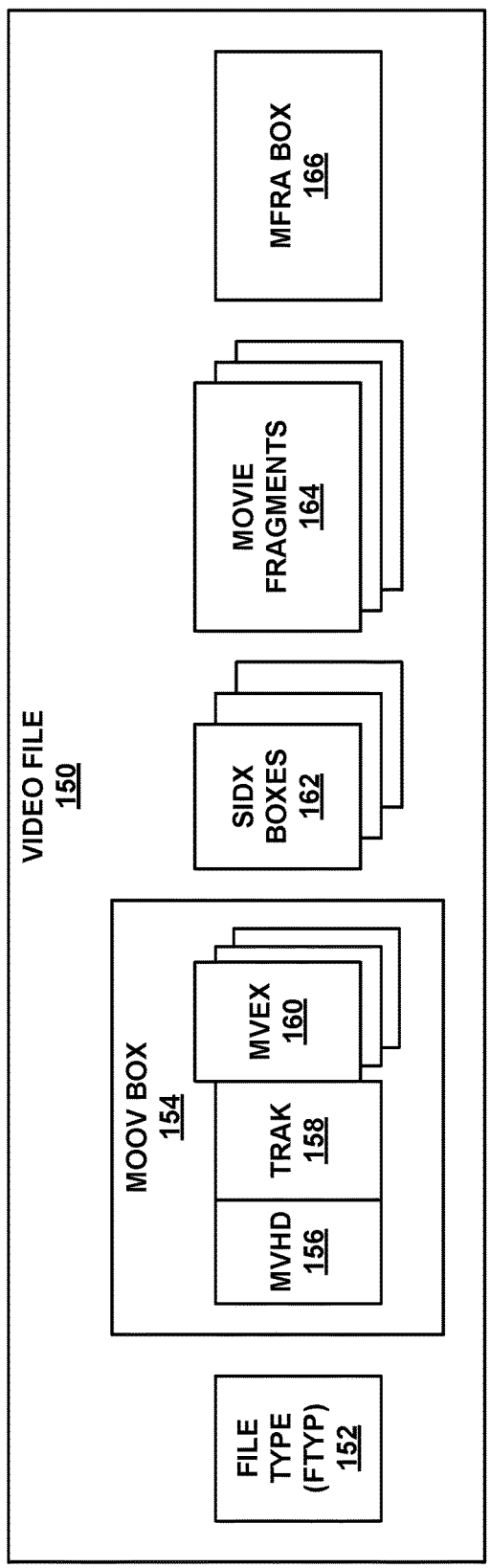
FIG. 4 is a block diagram illustrating elements of an example video file, which may correspond to a segment of a representation.

FIG. 4 is a block diagram illustrating elements of an example video file 150, which may correspond to a segment of a representation, such as one of segments 114, 124 of FIG. 3. Each of segments 128, 132 may include data that conforms substantially to the arrangement of data illustrated in the example of FIG. 4. Video file 150 may be said to encapsulate a segment. As described above, video files in accordance with the ISO base media file format and extensions thereof store data in a series of objects, referred to as "boxes." In the example of FIG. 4, video file 150 includes file type (FTYP) box 152, movie (MOOV) box 154, segment index (sidx) boxes 162, movie fragment (MOOF) boxes 164, and movie fragment random access (MFRA) box 166. Although FIG. 4 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may alternatively be placed before MOOV box 154, movie fragment boxes 164, and/or MFRA box 166.

Figure 7:
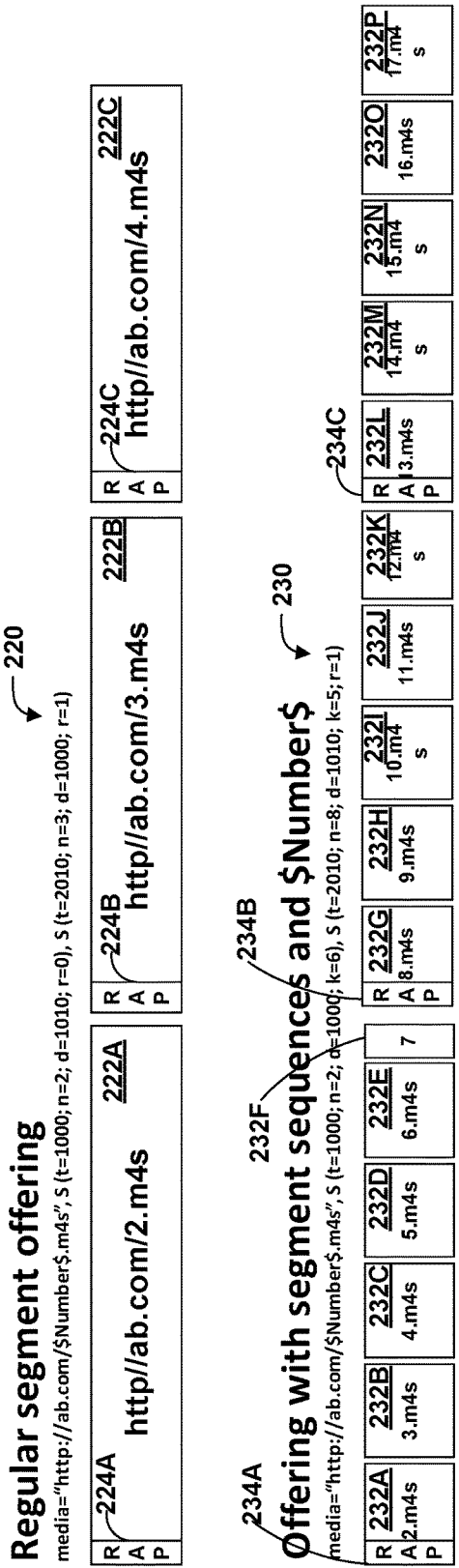
FIG. 7 is a conceptual diagram illustrating an example set of data that may be signaled according to the techniques of this disclosure.

In some examples, a Segment, such as video file 150, may include an MPD update box (not shown) before FTYP box 152. The MPD update box may include information indicating that an MPD corresponding to a representation including video file 150 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 150, where the STYP box may define a segment type for video file 150. FIG. 7, discussed in greater detail below, provides additional information with respect to the MPD update box.

MOOV box 154, in the example of FIG. 4, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 164, which may be referenced by data of TRAK box 158 and/or sidx boxes 162.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 3) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 164, e.g., to signal that video file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in video file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

As noted above, encapsulation unit 30 may store a sequence data set in a video sample that does not include actual coded video data. A video sample may generally correspond to an access unit, which is a representation of a coded picture at a specific time instance. In the context of AVC, the coded picture includes one or more VCL NAL units which contains the information to construct all the pixels of the access unit and other associated non-VCL NAL units, such as SEI messages. Accordingly, encapsulation unit 30 may include a sequence data set, which may include sequence level SEI messages, in one of movie fragments 164. Encapsulation unit 30 may further signal the presence of a sequence data set and/or sequence level SEI messages as being present in one of movie fragments 164 within the one of MVEX boxes 160 corresponding to the one of movie fragments 164.

SIDX boxes 162 are optional elements of video file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in video file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 164 may include one or more coded video pictures. In some examples, movie fragments 164 may include one or more groups of pictures (GOPs), each of which may include a number of coded video pictures, e.g., frames or pictures. In addition, as described above, movie fragments 164 may include sequence data sets in some examples. Each of movie fragments 164 may include a movie fragment header box (MFHD, not shown in FIG. 4). The MFHD box may describe characteristics of the corresponding movie fragment, such as a sequence number for the movie fragment. Movie fragments 164 may be included in order of sequence number in video file 150.

MFRA box 166 may describe random access points within movie fragments 164 of video file 150. This may assist with performing trick modes, such as performing seeks to particular temporal locations (i.e., playback times) within a segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragments 164 may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

Figure 5:
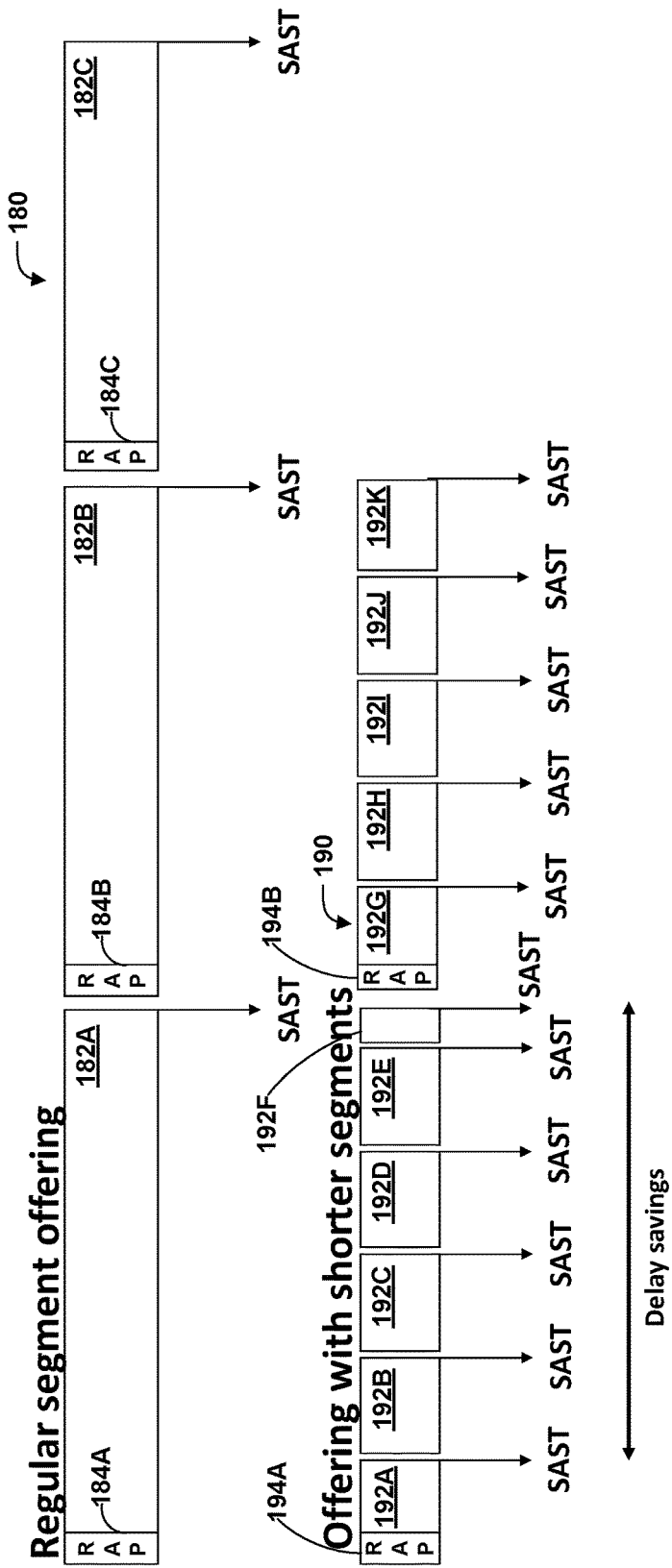
FIG. 5 is a conceptual diagram illustrating examples of regular segment offerings and offerings with shorter segments.

FIG. 5 is a conceptual diagram illustrating examples of regular segment offerings and offerings with shorter segments. That is, FIG. 5 illustrates an example regular segment offering 180 and an example offering with shorter segments 190. As shown in FIG. 5, shorter segments may reduce a playback initiation delay.

In regular DASH offerings, such as regular segment offering 180, segments 182A, 182B, 182C are offered to permit switching, random access, and delivery with the same granularity. Segments 182A, 182B, 182C include respective random access points (RAPs) 184A, 184B, 184C, which allow bitstream switching, e.g., switching between representations. As the content generator (e.g., content preparation device 20 of FIG. 1) may need to generate full segments 182A, 182B, 182C before publishing, the Segment availability start times (SASTs) for segments 182A, 182B, 182C are only available once the full respective one of segments 182A, 182B, 182C is generated. Offering with shorter segments 190 includes segments 192A-192K, and only segments 192A, 192G include respective RAPs 194A, 194B. With such shorter segments, the segment availability can be earlier, and the overall delay can be reduced.

However, for both regular segment offering 180 and offering with shorter segments 190, the SAST, as well as the segment address URLs, need to be generated and signaled in the MPD in a compact way, without frequent MPD updates or unnecessary restrictions on the coding. One may use accurate durations with Segment Timelines for the smaller segments (see FIG. 6 below), but this may result in many MPD updates as well as complex signalling and possibly ambiguous signalling. Due to prediction chains in the video, the exact presentation duration (and therefore, the address) cannot be determined.

Figure 6:
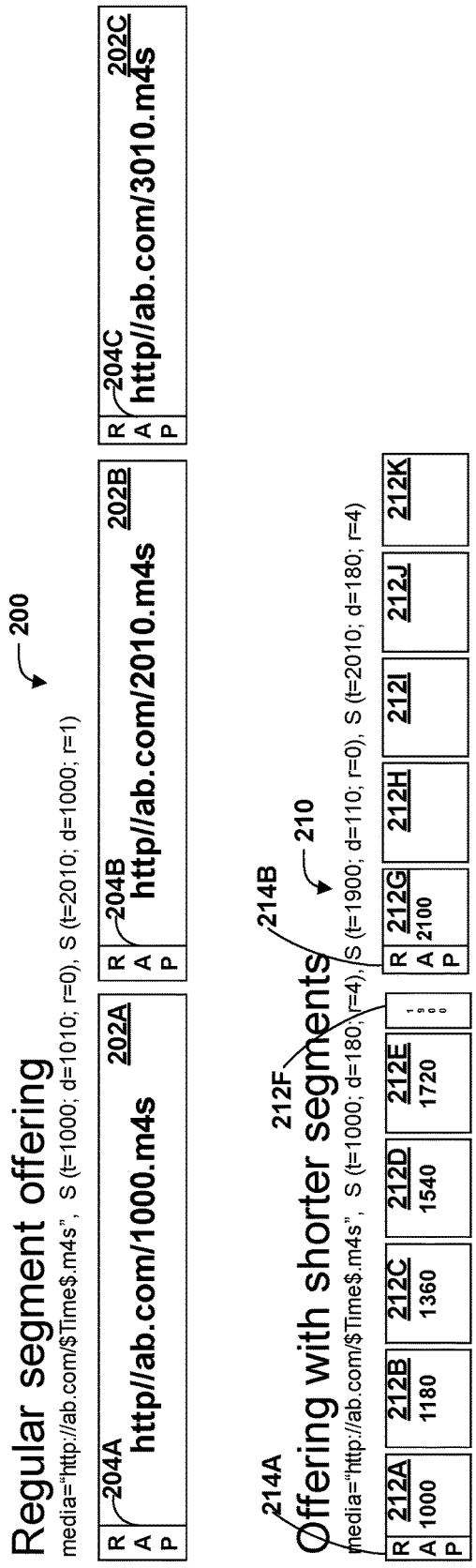
FIG. 6 is a conceptual diagram illustrating uniform resource locator (URL) addresses for segments available via regular segment offerings and offerings with shorter segments.

FIG. 6 is a conceptual diagram illustrating uniform resource locator (URL) addresses for segments available via regular segment offering 200 and offering with shorter segments 210. In this example, regular segment offering 200 includes segments 202A, 202B, 202C, each including respective RAPs 204A, 204B, 204C. Offering with shorter segments 210 includes segments 212A-212K, and only segments 212A and 212G include RAPs 214A, 214B, respectively.

As shown in FIG. 6, use of shorter segment offerings may make presentation durations for shorter segments difficult to determine, and therefore, URL addresses for the segments may also be difficult to determine. Therefore, $Time$ addressing with accurate Segment durations may be impractical.

FIG. 7 is a conceptual diagram illustrating example sets of data that may be signaled according to the techniques of this disclosure. FIG. 7 illustrates example regular segment offering 220 and offering with segment sequences and $Number$ attributes 230. Regular segment offering 220 includes segments 222A, 222B, 222C, each including respective RAPs 224A, 224B, 224C. In this example, offering with segment sequences and $Number$ attributes 230 includes segments 232A-232P, and segments 232A, 232G, 232L include respective RAPs 234A, 234B, 234C.

The techniques of this disclosure generally involve signaling an attribute in a manifest file, such as a media presentation description (MPD) file, that specifies a number of segments included in a Segment Sequence. For example, for MPD files, an "@k" attribute may be added to an S element of the segment timeline in the MPD file.

As shown in the example of FIG. 7, attributes are signaled for offering with segment sequences and $Number$ attributes 230. In particular, in the example of offering with segment sequences and $Number$ attributes 230 in FIG. 7, the set of attributes is signaled as:

media="http://ab.com/Time$_$SubNumber$.m4s", S (t=1000; d=1000; k=6), S (t=2010; d=1000; k=5; r=1)

Client device 40 of FIG. 1 may simply increase segment numbers by using the $Number$ template, as shown in FIG. 7. That is, client device 40 of FIG. 1 may address (e.g., specify in a request, such as an HTTP GET or partial GET request) each of the shorter segments by incrementing the segment numbers by "1." In the example of FIG. 7, for example, segment 222A of regular segment offering 220 corresponds to segments 232A-232F of offering with shorter segments 230, segment 222B of regular segment offering 220 corresponds to segments 232G-232K of offering with shorter segments 230, and segment 222C of regular segment offering 220 corresponds to segments 232L-232P of offering with shorter segments 230.

Segments 232A-232P are named according to an incremental naming scheme, in this example, where the name of a segment corresponds to a number followed by ".m4s." For example, segment 232A is named "2.m4s," segment 232B is named "3.m4s," and so on. Client device 40 (and in particular, retrieval unit 52) of FIG. 1 may specify an identifier for a desired one of segments 232A-232P using the name of the corresponding segment. E.g., to retrieve segment 232A, client device 40 may send a request specifying the URL: "ab.com/2.m4s" to server device 60. This segment naming scheme (or addressing scheme) works well for certain use cases, because the segment numbers simply increase by 1. Thus, this would be useful for, e.g., Advanced Television Systems Committee (ATSC) with Real-Time Object Delivery over Unidirectional Transport (ROUTE). This scheme also does not require updates to a templating scheme in DASH.

For other use cases, this simple number based signaling may not be sufficient. The reason is that it does not work with $Time$, or a use case in which a regular offering is provided together with a low latency offering, is that the segment numbers diverge. Based on these discussions and the $Time$, a hierarchical numbering for both, $Number$ and $Time$-based signaling may be beneficial.

Figure 8:
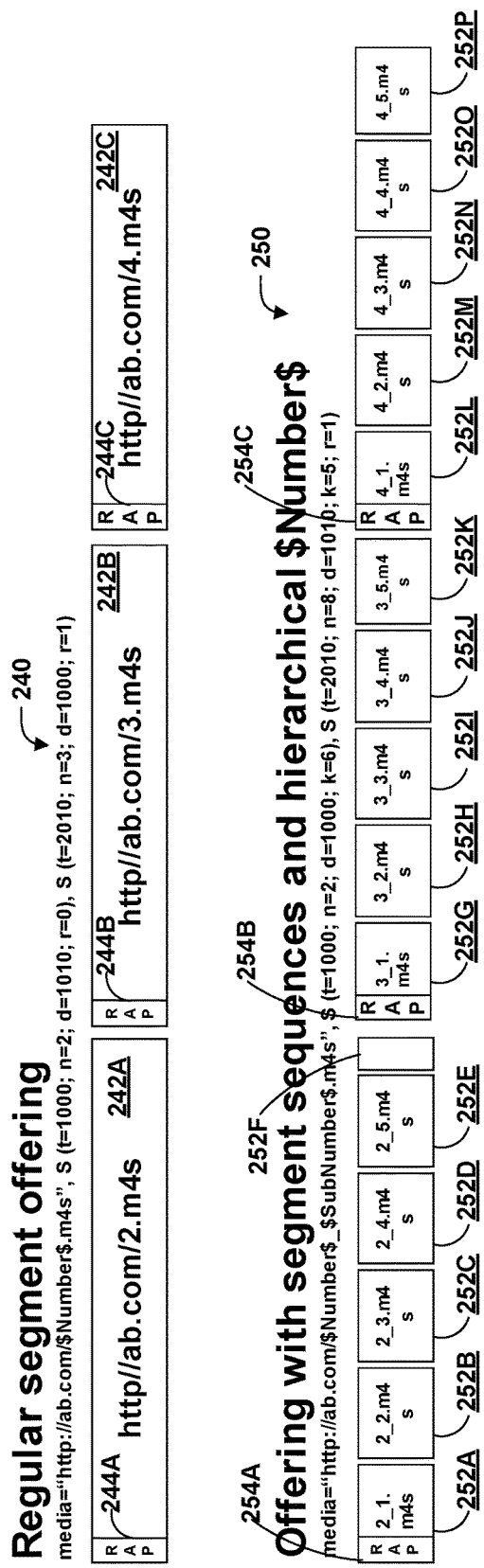
FIG. 8 illustrates an example of techniques for using hierarchical numbering for segments in accordance with the techniques of this disclosure.

FIG. 8 illustrates an example of techniques for using hierarchical numbering for segments in accordance with the techniques of this disclosure. In this example, regular segment offering 240 includes segments 242A, 242B, 242C, each of which includes a respective RAP 244A, 244B, 244C. Offering with segment sequences 250, in this example, includes hierarchically-identified segments, i.e., segments 252A-252P, and segments 252A, 252G, 252L include respective RAPs 254A, 254B, 254C.

In the example of FIG. 8, shorter segments 252A-252P are addressed using a hierarchical signalling scheme. In particular, in the example of FIG. 8, segment 242A of regular segment offering 240 corresponds to segments 252A-252F (named "2_1.m4s" to 2_6.m4s" in this example) of offering with segment sequences 250, segment 242B of regular offering 240 corresponds to segments 252G-252K (named "3_1.m4s" to "3_5.m4s" in this example) of offering with segment sequences 250, and segment 242C of regular offering 240 corresponds to segments 252L-252P (named "4_1.m4s" to "4_5.m4s" in this example) of offering with segment sequences 250. Segments 242A, 242B, 242C are respectively named "2.m4s," "3.m4s," and "4.m4s," in this example. In this manner, the naming scheme can be said to be hierarchical, in that segments 252A-252P are named in two-part form: a first part representing a name of a corresponding one of segments 242A-242C, and a second part representing a relative order of segments 252A-252P within the segment sequence corresponding to the same one of segments 242A-242C.

Thus, each of segments 242A-242C of regular segment offering 240 may have a corresponding segment sequence of offering with segment sequences 250. Segments 252A-252P may be addressed by requesting (e.g., using HTTP GET or partial GET requests) a URL specifying the base URL followed by "M_N.m4s," where "M" represents the name of the corresponding one of segments 242A-242C, and "N" represents an ordinal identifier of a segment in the segment sequence corresponding to the one of segments 242A-242C. Thus, to retrieve segment 252J, client device 40 may determine that segment 252J corresponds to segment 242B, and is the fourth segment in the segment sequence. Accordingly, client device 40 may send a request specifying "ab.com/3_4.m4s," to retrieve segment 252J.

Hierarchical signalling in this manner may enable deployment of different size segments in a single MPD, as well as simple switching. Hierarchical signalling in this manner may also avoid the need for accurate signalling of durations for segments in a segment sequence.

Figure 9:
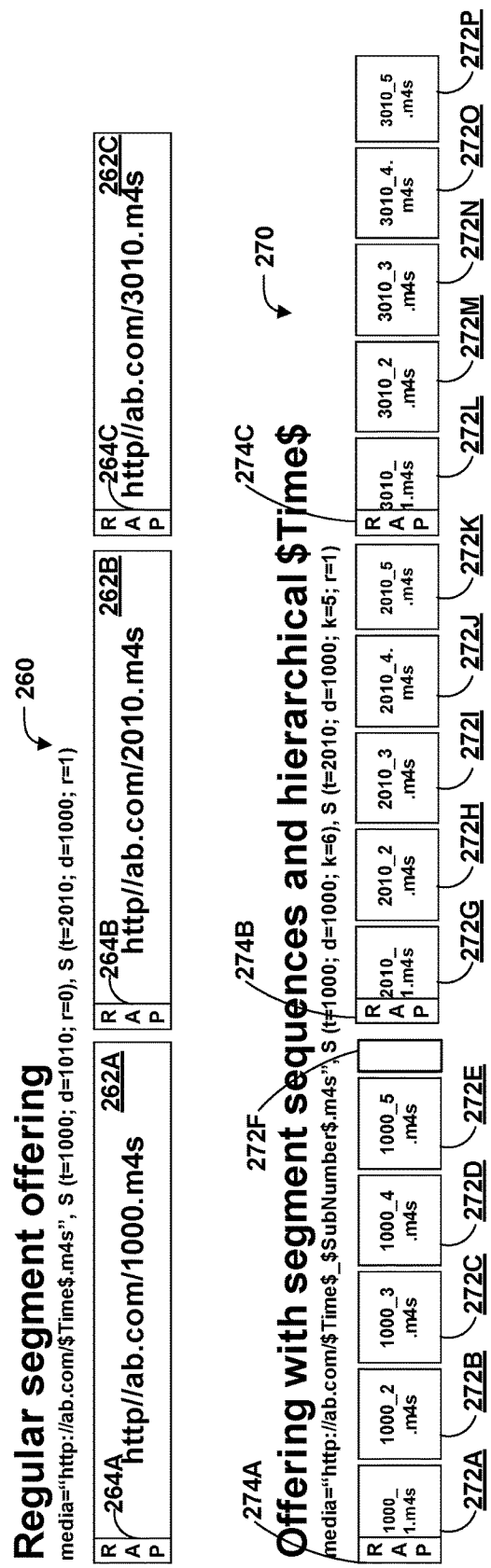
FIG. 9 illustrates another example of techniques for using hierarchical numbering for segments in accordance with the techniques of this disclosure.

FIG. 9 illustrates another example of techniques for using hierarchical numbering for segments in accordance with the techniques of this disclosure. In this example, rather than addressing segments by segment number, the segments of the regular offering may be addressable by information representative of duration. In this example, regular segment offering 260 includes segments 262A-262C, each including respective RAPs 264A, 264B, 264C. Segments 262A-262C are named according to the duration of the respective segment, plus the accumulated durations of earlier segments. In this example, segment 262A has a duration of 1010, and segment 262B has a duration of 1000. Furthermore, segment 262A follows one or more segments having a total segment duration of 1000. Thus, segment 262A is named "1000.m4s," segment 262B is named "2010.m4s," (1000+1010), and segment 262C is named "3010.m4s," (2010+1000).

Offering with segment sequences 270 includes shorter segments 272A-272P. However, in this example, segments 272A-272P may be addressable by a duration component and a sub-number component. The duration component may represent the name of the corresponding one of segments 262A-262C in regular segment offering 260, as discussed above. The sub-number component may represent a segment number for the one of segments 272A-272P of offering with segment sequences 270.

Thus, in the example of FIG. 9, segment 262A (named "1000.m4s") of the regular segment offering 260 corresponds to segments 272A-272F (respectively named "1000_1.m4s" to "1000_6.m4s") of offering with segment sequences 270, segment 262B (named "2010.m4s") of regular segment offering 260 corresponds to segments 272G-272K (respectively named "2010_1.m4s" to "2010_5.m4s") of offering with segment sequences 270, and segment 262C (named "3010.m4s") of regular segment offering 260 corresponds to segments 272L-272P (respectively named "3010_1.m4s" to "3010_5.m4s") of offering with segment sequences 270.

Accordingly, client device 40 may determine names of segments 262A-262C based on accumulated durations of these segments, as discussed above. Moreover, client device 40 may determine names/identifiers of segments 272A-272P by determining a name for a corresponding one of segments 262A-262C, then determining a position of the one of segments 272A-272P within a sequence of segments corresponding to the one of segments 262A-262C. For example, client device 40 of FIG. 1 may determine that the name for segment 272J is "2010_4.m4s," by determining that the name of the corresponding segment 262B in regular segment offering 260 is "2010.m4s," and determining that segment 272J is the fourth segment in the segment sequence corresponding to segment 262B. To request segment 272J, client device 40 may therefore submit an HTTP GET or partial GET request specifying "ab.com/2010_4.m4s" as a URL of segment 272J.

One potential advantage of the example of FIG. 9 is that the earliest presentation time of a next Segment Sequence (e.g., a segment sequence corresponding to segment 262B) in the same Representation may be derived from the sum of the earliest presentation of the current Segment Sequence (1000) and the duration of the Segment resulting from the concatenation of all Media Segments in a Segment Sequence. In the case of ISO BMFF, this may be accomplished by summing the track runs of segments in the segment sequence.

In this manner, client device 40 may address segments of a shorter segment offering using a two-part naming scheme including a first part and a second part. The first part may represent segment numbers of corresponding segments 242A-242C of regular segment offering 240 (per the example of FIG. 8) or timing information for corresponding segments 262A-262C of regular segment offering 260 (per the example of FIG. 9). The timing information may indicate, for example, a playback time at which the corresponding segment is to begin being played. The second part may represent simple numeric increments (per the examples of FIGS. 8 and 9). In particular, the two-part naming schemes may be referred to as "$Number$.$Chunk$" and "$Time$.$Chunk$," respectively. Alternatively, the two-part naming schemes may be referred to as "$Number$.$ChunkNumber$" and "$Time$.$ChunkNumber$," respectively.

Accordingly, devices that use DASH (such as client device 40, server device 60, and content preparation device 20 of FIG. 1) may be configured to use the techniques of this disclosure to process (e.g., form or parse and interpret) a manifest file including the data discussed herein, such as an attribute (e.g., an attribute "@k") indicating a number of segment "chunks" available in a shorter segment offering, as well as to address segments in accordance with any or all of the techniques discussed herein using the attribute of the manifest file referred to above.

With respect to the example of DASH as specified in ISO/IEC 23009-1, Section 5.3.9.4.4 of DASH may be modified as shown below, where text surrounded by begin and end addition symbols "||+>||" and "||+<||" represent additions and text surrounded by begin and end deletion symbols "−" and ||−<||" represent removals, other parts remaining unchanged.

5.3.9.4.4 Template-based Segment URL construction

The SegmentTemplate@media attribute, the SegmentTemplate@index attribute, the SegmentTemplate@initialization attribute and the SegmentTemplate@bitstreamSwitching attribute each contain a string that may contain one or more of the identifiers as listed in Table 16.

In each URL, the identifiers from Table 16 shall be replaced by the substitution parameter defined in Table 16. Identifier matching is case-sensitive. If the URL contains unescaped $ symbols which do not enclose a valid identifier then the result of URL formation is undefined. In this case it is expected that the DASH Client ignores the entire containing Representation element and the processing of the MPD continues as if this Representation element was not present. The format of the identifier is also specified in Table 16.

Each identifier may be suffixed, within the enclosing '$' characters, with an additional format tag aligned with the printf format tag as defined in IEEE 1003.1-2008 [10] following this prototype:

%0[width]d

The width parameter is an unsigned integer that provides the minimum number of characters to be printed. If the value to be printed is shorter than this number, the result shall be padded with zeros. The value is not truncated even if the result is larger.

The Media Presentation shall be authored such that the application of the substitution process results in valid Segment URLs.

Strings outside identifiers shall only contain characters that are permitted within URLs according to RFC 3986.

TABLE 16

Identifiers for URL Templates

| $<Identifier>$ | Substitution parameter | Format |
|---|---|---|
| ||+>||$$||+<|| | Is an escape sequence, i.e. "$$" is replaced with a single "$" | not applicable |
| $RepresentationID$ | This identifier is substituted with the value of the attribute Representation@id of the containing Representation. | The format tag shall not be present. |
| $Number$ | This identifier is substituted with the ||+>||number||+<|| of the corresponding Segment, ||+>||if $SubNumber$ is not present in the same string. If $SubNumber$ is present, this identifier is substituted with the number of the corresponding Segment sequence. For details refer to 5.3.9.6.4 and 5.3.9.6.5.||+<|| | The format tag may be present. If no format tag is present, a default format tag with width = 1 shall be used. |
| $Bandwidth$ | This identifier is substituted with the value of Representation@bandwidth attribute value. | The format tag may be present. If no format tag is present, a default format tag with width = 1 shall be used. |
| $Time$ | This identifier is substituted with the value of the MPD start time of the Segment being accessed. For the Segment Timeline this means that this identifier is substituted with the value of the SegmentTimeline@t attribute for the Segment being accessed. Either $Number$ or $Time$ may be used but not both at the same time. | The format tag may be present. If no format tag is present, a default format tag with width = 1 shall be used. |
| ||+>||$SubNumber$||+<|| | ||+>||This identifier is substituted with the number of the corresponding Segment in a Segment Sequence. This identifier shall only be present if either $Number$ or $Time$ are present as well. For details refer to 5.3.9.6.4 and 5.3.9.6.5.||+<|| | ||+>||The format tag may be present. If no format tag is present, a default format tag with width = 1 shall be used.||+<|| |

Change 5.3.9.6 Segment timeline (SISSI Change ||+>||6||+
<|| ||–>||5||–<||)
5.3.9.6.1 General The SegmentTimeline element expresses the earliest presentation time and presentation duration (in units based on the @timescale attribute) for each Segment in the Representation. The use is an alternative to providing the @duration attribute and provides three additional features:
- the specification of arbitrary Segment durations,
- the specification of accurate Segment durations for one media stream where the duration expresses presentation duration of the Segment, and
- the signalling of discontinuities of the Media Presentation timeline for which no Segment data are present in a specific Representation.
- the ability to signal Segment sequences. For more details refer to 5.3.9.6.4. Segment sequences shall only be used if explicitly permitted by the profile in use.

For compactness the syntax of this element includes run-length compression to express a sequence of Segments having constant duration.

The SegmentTimeline element shall contain a list of S elements each of which describes a sequence of contiguous Segments. of identical MPD duration. The S element contains a mandatory @d attribute specifying the MPD duration, an optional @r repeat count attribute specifying the number of contiguous Segments with identical MPD duration minus one and an optional @t time attribute. The value of the @t attribute minus the value of the @presentationTimeOffset specifies the MPD start time of the first Segment in the series.

The @r attribute has a default value of zero (i.e., a single Segment in the series) when not present. For example, a repeat count of three means there are four contiguous Segments, each with the same MPD duration. The value of the @r attribute of the S element may be set to a negative value indicating that the duration indicated in @d is promised to repeat until the S@t of the next S element or if it is the last S element in the SegmentTimeline element until the end of the Period or the next update of the MPD, i.e. it is treated in the same way as the @duration attribute for a full period.

Any @d value shall not exceed the value of MPD@maxSegmentDuration.

The textual order of the S elements within the SegmentTimeline element shall match the numbering (and thus time) order of the corresponding Media Segments.

When the SegmentTemplate is in use and the $Time$ identifier is present in the SegmentTemplate@media then:
- If a Segment Index ('sidx') box is present, then the values of the SegmentTimeline shall describe accurate timing of each Media Segment. Specifically, these values shall reflect the information provided in the Segment index ('sidx') box, i.e.:
  - the value of @timescale shall be identical to the value of the timescale field in the first 'sidx' box,
  - the value of S@t shall be identical to the value of the earliest_presentation_time in the first 'sidx' box of the Media Segment described in S,
  - the value of S@d shall be identical to sum of the values of all Subsegment_duration fields in the first 'sidx' box of the Media Segment described in S.
- If a Segment Index ('sidx') box is not present, then the derivation of the earliest presentation time shall be based on the media internal data. The details depend on the segment format in use and further restriction on the segment format may apply.
- The Segment URL for a Media Segment is obtained by replacing the $Time$ identifier by the earliest presentation time obtained from the SegmentTimeline.

NOTE As the earliest presentation time of the next Media Segment in the same Representation may be derived from the actual Media Segment, e.g. by the use of the Segment Index, the Segment URL may be generated without reading of the updated MPD that contains the update to the Segment Timeline.

The semantics of the attributes and elements for Segment Timeline are provided in 5.3.9.6.2, Table 17. The XML syntax of the Segment Timeline is provided in 5.3.9.6.3.

5.3.9.6.2 Semantics

TABLE 17

Semantics of SegmentTimeline element

| Element or Attribute Name | Use | Description |
| --- | --- | --- |
| SegmentTimeline | | specifies the Segment timeline information |
| S | 1 . . . N | specifies Segment start time and duration for a contiguous sequence of segments of identical durations, referred to as series in the following. Note: the sequence of S parameters is defined by the @t semantics. |
| @t | O | specifies the MPD start time, in @timescale units, of the first Segment in the series starts relative to the beginning of the Period. The value of this attribute must be equal to or greater than the sum of the previous S element earliest presentation time and the sum of the contiguous Segment durations. If the value of the attribute is greater than what is expressed by the previous S element, it expresses discontinuities in the timeline. If not present then the value shall be assumed to be zero for the first S element and for the subsequent S elements, the value |

TABLE 17-continued

Semantics of SegmentTimeline element

| Element or Attribute Name | Use | Description |
|---|---|---|
| | | shall be assumed to be the sum of the previous S element's earliest presentation time and contiguous duration (i.e. previous S@t + @d * (@r + 1)). |
| @n | O | specifies the Segment number of the first Segment in the series. The value of this attribute must be at least one greater than the number of previous S elements plus the @startNumber attribute value, if present. If the value of @n is greater than one plus the previously calculated Segment number, it expresses that one or more prior Segments in the timeline are unavailable. |
| @d | M | specifies the Segment duration, in units of the value of the @timescale. |
| ||+>||@k||+<|| | ||+>||OD||+<|| default: 1 | ||+>||specifies the number of Segments that are included in a Segment Sequence. The attribute shall not be present unless explicitly permitted by the profile. For more details refer to 5.3.9.6.3.||+<|| |
| @r | OD default: 0 | specifies the repeat count of the number of following contiguous Segments with the same duration expressed by the value of @d. This value is zero-based (e.g. a value of three means four Segments in the contiguous series). A negative value of the @r attribute of the S element indicates that the duration indicated in @d attribute repeats until the start of the next S element, the end of the Period or until the next MPD update. |

Legend:
For attributes: M = Mandatory, O = Optional, OD = Optional with Default Value, CM = Conditionally Mandatory.
For elements: <minOccurs> ... <maxOccurs> (N = unbounded)
Elements are bold; attributes are non-bold and preceded with an @.

---

5.3.9.6.3 XML syntax

```
<!-- Segment Timeline -->
<xs:complexType name="SegmentTimelineType">
  <xs:sequence>
    <xs:element name="S" minOccurs="1" maxOccurs="unbounded"
    >
      <xs:complexType>
        <xs:attribute name="t" type="xs:unsignedLong"/>
        <xs:attribute name="n" type="xs:unsignedLong"
        use="optional"/>
        <xs:attribute name="d" type="xs:unsignedLong"
        use="required"/>
        ||+>||<xs:attribute name="k" type="xs:unsignedLong"
        default="1"/>||+<||
        <xs:attribute name="r" type="xs:int" use="optional"
        default="0"/>
        <xs:anyAttribute namespace="##other"
        processContents="lax"/>
      </xs:complexType>
    </xs:element>
    <xs:any namespace="##other" processContents="lax"
    minOccurs="0"
maxOccurs="unbounded"/>
  </xs:sequence>
  <xs:anyAttribute namespace="##other" processContents="lax"/>
</xs:complexType>
```

||+>||5.3.9.6.4 Segment Sequences

Segment sequences in the Segment Timeline may be signaled with including a @k attribute in the S element of the SegmentTimeline. The @k shall only be present if all of the following requirements are fulfilled:
- the addressing scheme for the associated Representation is using Segment template with either $Number$ or hierarchical templating and sub-numbering as defined in 5.3.9.6.5,
- the profile explicitly allows the usage of Segment sequences.

If @k is present and greater than 1, then it specifies that sequence described by @d is accurate in timing, but contains @k Segments.

The MPD duration of the Segment is determined as the value of @d divided by the value of @k and determines the MPD start time and therefore the Segment availability start time. Note that MPD duration of the Segments is not required to exactly match the media duration of the Segments.

The concatenation of all Segments in a Segment sequence shall have an accurate segment duration according of the value of @d.

5.3.9.6.5 Hierarchical Templating and Sub-Numbering

If the Segment template contains a $SubNumber$ value and a Segment Timeline signaling with Segment sequence is used, then if $Time$ is present, the $Time$ is replaced with the earliest presentation time of the Segment sequence for all Segments in the Segment Sequence, if $Number$ is present, the $Number$ is replaced with the number of the Segment sequence, i.e. with the number as if every Segment sequence in the Segment timeline is treated as single Segment, and in both cases the $SubNumber$ is replaced the Segment number of the Segment Sequence, with 1 being the number of the first Segment in the sequence.

NOTE The earliest presentation time of the next Segment Sequence in the same Representation may be derived from the sum of the earliest presentation of the current Segment Sequence and the duration of the Segment resulting from the concatenation of all Media Segments in a Segment Sequence. In case of ISO BMFF, this may be accomplished by summing the track runs of segments in the segment sequence. ||+<||

Figure 10:
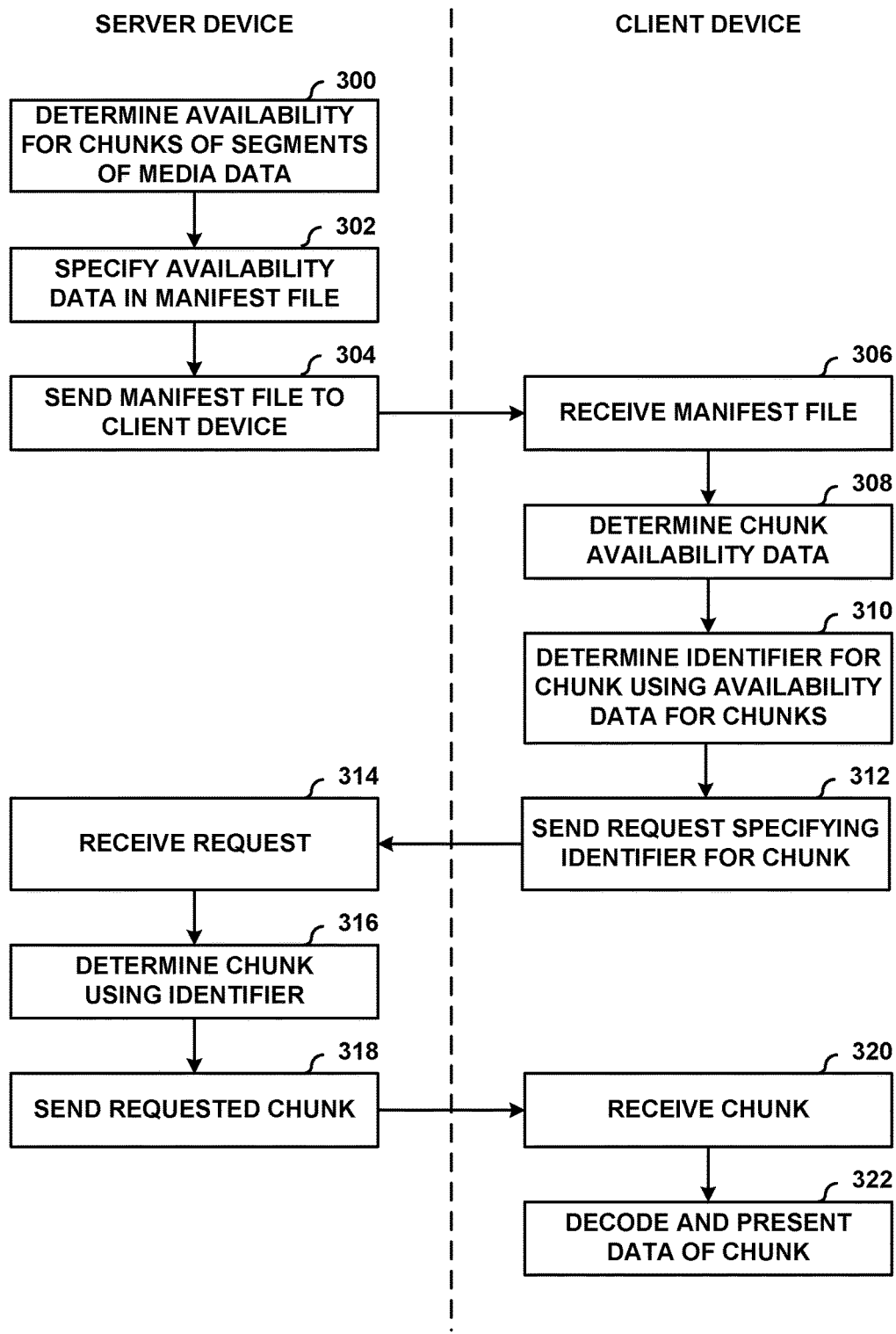
FIG. 10 is a flowchart illustrating an example method of transporting (sending and receiving) media data according to the techniques of this disclosure.

FIG. 10 is a flowchart illustrating an example method of transporting (sending and receiving) media data according to the techniques of this disclosure. The method of FIG. 10 is described as being performed by server device 60 and client device 40 of FIG. 1. However, it should be understood that additional or alternative devices may be configured to perform this or a similar method. For example, content preparation device 20 may perform portions of the method attributed to the server device in conjunction with, or instead of, server device 60.

Initially, server device 60 may determine availability of chunks of segments of media data (300). For example, server device 60 may determine a number of chunks for each of a plurality of segments of a representation or adaptation set of the media data. Server device 60 may then specify the availability data in a manifest file (302), such as a media presentation description (MPD). For example, as discussed above, server device 60 may signal an "@k" element of an S element in a segment timeline element of the manifest file. The @k element may represent a number of segments included in a segment sequence. Such number of segments may be understood as chunks of a segment, and the segment sequence may correspond to a sequence of the chunks for the corresponding segment. Server device 60 may then send the manifest file to client device 40 (304), e.g., in response to a request from client device 40 for the manifest file.

Client device 40 may receive the manifest file (306). Client device 40 may then determine the chunk availability data (308) from the manifest file. For example, retrieval unit 52 (FIG. 1) of client device 40 may extract the "@k" element from the manifest file, to determine a number of chunks in a segment. Client device 40 may then determine an identifier for a chunk using the availability data for the hunks (310). For example, as discussed above with respect to FIGS. 8 and 9, client device 40 may determine a two-part identifier for a chunk: a first part representing a name of a corresponding segment in a regular segment offering (which may be an ordinal identifier or an identifier based on durations, as discussed above), and a second part representing an ordinal identifier of the chunk in a sequence of chunks corresponding to the segment (as also discussed above).

After determining an identifier for a chunk to be retrieved, client device 40 may send a request specifying the identifier for the chunk (312). For example, client device 40 may construct an HTTP GET or partial GET request specifying the identifier for the chunk as part of a URL for the request. Client device 40 may then send the request to server device 60.

Server device 60 may then receive the request (314). Server device 60 may determine the requested chunk using the identifier (316) as specified in the request, e.g., a URL for the chunk. Server device 60 may then send the requested chunk (318) to client device 40.

Client device 40 may then, in turn, receive the chunk (320) and decode and present media data of the chunk (322). For example, decapsulation unit 50 (which may alternatively be referred to as a file processing or parsing unit) may extract encoded media data from the chunk, and send the encoded media data to audio decoder 46 or video decoder 48, depending on the type of media data. Audio decoder 46/video decoder 48 may decode the media data, and send decoded media data to audio output 42/video output 44 for presentation.

In this manner, the method of FIG. 10 represents an example of a method including receiving a manifest file including data indicating a number of segment chunks available for a segment of a representation of media data, the segment comprising an independently retrievable media file having a unique uniform resource locator (URL), determining an identifier for one of the chunks using the data indicating the number of chunks available for the segment, and sending a request specifying the identifier for the one of the chunks to a server device.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of retrieving media data, the method comprising:
    receiving a manifest file including a SegmentTimeline element for a representation of media data, the SegmentTimeline element including a plurality of SegmentTimeline S sub-elements, each of the SegmentTimeline S sub-elements corresponding to a respective contiguous sequence of segments of the representation, the segments of the respective contiguous sequence of segments having identical durations, each of the SegmentTimeline S sub-elements including data representing a start time and duration for the respective contiguous sequence of segments, at least one of the SegmentTimeline S sub-elements including:
        a respective @t attribute specifying a start time of a first segment of the respective contiguous sequence of segments,
        a respective @k attribute specifying a number of segments in the respective contiguous sequence of segments having identical durations,
        a respective @n attribute specifying a segment number of the first segment of the respective contiguous sequence of segments,
        a respective @d attribute specifying a duration for the respective contiguous sequence of segments such that the identical durations of the segments in the respective contiguous sequence of segments is equal to the value of the respective @d attribute divided by the value of the respective @k attribute, and
        a respective @r attribute specifying a repeat count of a number of contiguous segments or segment sequences following the respective contiguous sequence of segments that have a duration that is the same as the value of the respective @d attribute,
    each of the segments in each of the contiguous sequences of segments comprising a respective independently retrievable media file having a respective unique uniform resource locator (URL);
    determining an identifier for one of the segments using the @k attribute for the SegmentTimeline S-sub element corresponding to the contiguous sequence of segments including the one of the segments; and
    sending a request specifying the identifier for the one of the segments to a server device.

2. The method of claim 1, wherein determining the identifier for the one of the segments comprises determining the identifier according to a numbering template for the segments.

3. The method of claim 1, wherein determining the identifier for the one of the segments comprises determining the identifier according to a hierarchical addressing scheme.

4. The method of claim 3, wherein the hierarchical addressing scheme specifies a first part and a second part for the identifier.

5. The method of claim 4, wherein the first part specifies a numeric identifier for the segment.

6. The method of claim 4, wherein the first part specifies timing information for the segment.

7. The method of claim 6, wherein the timing information indicates a playback time at which the segment is to begin being played.

8. The method of claim 4, wherein the second part specifies an ordinal identifier of the one of the segments.

9. The method of claim 1, wherein sending the request comprises sending one of a HyperText Transfer Protocol (HTTP) GET request or an HTTP partial GET request.

10. The method of claim 1, further comprising determining the URLs of the segments in the contiguous sequence of segments according to a URL template.

11. The method of claim 1, wherein the manifest file does not express exact segment durations for the segments in the contiguous sequence of segments.

12. The method of claim 1, wherein determining the identifier comprises determining the identifier without determining durations for the segments in the contiguous sequence of segments.

13. The method of claim 1, further comprising determining segment availability start times for the segments in the contiguous sequence of segments using the values of the @t attributes, the @d attributes, and the @k attributes, wherein sending the request for the one of the segments comprises sending the request no sooner than a determined availability start time for the one of the segments.

14. The method of claim 1, further comprising:
    determining the duration for the contiguous sequence of segments from the manifest file; and
    dividing the duration by the number of segments in the contiguous sequence of segments to determine duration values for the segments in the contiguous sequence of segments.

15. A device for retrieving media data, the device comprising one or more processors implemented in circuitry and configured to:
    receive a manifest file including a SegmentTimeline element for a representation of media data, the SegmentTimeline element including a plurality of SegmentTimeline S sub-elements, each of the SegmentTimeline S sub-elements corresponding to a respective contiguous sequence of segments of the representation, the segments of the respective contiguous sequence of segments having identical durations, each of the SegmentTimeline S sub-elements including data representing a start time and duration for the respective contiguous sequence of segments, at least one of the SegmentTimeline S sub-elements including:
- a respective @t attribute specifying a start time of a first segment of the respective contiguous sequence of segments,
- a respective @k attribute specifying a number of segments in the respective contiguous sequence of segments having identical durations,
- a respective @n attribute specifying a segment number of the first segment of the respective contiguous sequence of segments,
- a respective @d attribute specifying a duration for the respective contiguous sequence of segments such that each of the segments in the respective contiguous sequence of segments has a duration of the value of the respective @d attribute divided by the value of the respective @k attribute, and
- a respective @r attribute specifying a repeat count of a number of contiguous segments or segment sequences following the respective contiguous sequence of segments that have a duration that is the same as the value of the respective @d attribute, each of the segments in each of the contiguous sequences of segments comprising a respective independently retrievable media file having a respective unique uniform resource locator (URL);
determine an identifier for one of the segments using the @k attribute for the SegmentTimeline S-sub element corresponding to the contiguous sequence of segments including the one of the segments; and
send a request specifying the identifier for the one of the segments to a server device.

16. The device of claim 15, wherein the one or more processors are configured to determining the identifier according to a numbering template for the segments.

17. The device of claim 15, wherein the one or more processors are configured to determine the identifier according to a hierarchical addressing scheme.

18. The device of claim 17, wherein the hierarchical addressing scheme specifies a first part and a second part for the identifier.

19. The device of claim 18, wherein the first part specifies a numeric identifier for the segment.

20. The device of claim 18, wherein the first part specifies timing information for the segment.

21. The device of claim 20, wherein the timing information indicates a playback time at which the segment is to begin being played.

22. The device of claim 18, wherein the second part specifies an ordinal identifier of the one of the segments.

23. The device of claim 15, wherein to send the request, the one or more processors are configured to send one of a HyperText Transfer Protocol (HTTP) GET request or an HTTP partial GET request.

24. The device of claim 15, wherein the one or more processors are further configured to determine the URLs of the segments in the contiguous sequence of segments according to a URL template.

25. The device of claim 15, wherein the manifest file does not express exact segment durations for the segments in the contiguous sequence of segments.

26. The device of claim 15, wherein the one or more processors are configured to determine the identifier without determining durations for the segments in the contiguous sequence of segments.

27. The device of claim 15, wherein the one or more processors are further configured to determine segment availability start times for the segments in the contiguous sequence of segments using the values of the @t attributes, the @d attributes, and the @k attributes, wherein the one or more processors are configured to send the request no sooner than a determined availability start time for the one of the segments.

28. The device of claim 15, wherein the one or more processors are further configured to:
- determine the duration for the contiguous sequence of segments from the manifest file; and
- divide the duration by the number of segments in the contiguous sequence of segments to determine duration values for the segments in the contiguous sequence of segments.

29. A device for retrieving media data, the device comprising:
means for receiving a manifest file including a SegmentTimeline element for a representation of media data, the SegmentTimeline element including a plurality of SegmentTimeline S sub-elements, each of the SegmentTimeline S sub-elements corresponding to a respective contiguous sequence of segments of the representation, the segments of the respective contiguous sequence of segments having identical durations, each of the SegmentTimeline S sub-elements including data representing a start time and duration for the respective contiguous sequence of segments, at least one of the SegmentTimeline S sub-elements including:
- a respective @t attribute specifying a start time of a first segment of the respective contiguous sequence of segments,
- a respective @k attribute specifying a number of segments in the respective contiguous sequence of segments having identical durations,
- a respective @n attribute specifying a segment number of the first segment of the respective contiguous sequence of segments,
- a respective @d attribute specifying a duration for the respective contiguous sequence of segments such that the identical durations of the segments in the respective contiguous sequence of segments is equal to the value of the respective @d attribute divided by the value of the respective @k attribute, and
- a respective @r attribute specifying a repeat count of a number of contiguous segments or segment sequences following the respective contiguous sequence of segments that have a duration that is the same as the value of the respective @d attribute, each of the segments in each of the contiguous sequences of segments comprising a respective independently retrievable media file having a respective unique uniform resource locator (URL);
means for determining an identifier for one of the segments using the @k attribute for the SegmentTimeline S-sub element corresponding to the contiguous sequence of segments including the one of the segments; and
means for sending a request specifying the identifier for the one of the segments to a server device.

30. A non-transitory, computer-readable storage medium having stored thereon instructions that, when executed, cause a processor to:
receive a manifest file including a SegmentTimeline element for a representation of media data, the SegmentTimeline element including a plurality of Segment- Timeline S sub-elements, each of the SegmentTimeline S sub-elements corresponding to a respective contiguous sequence of segments of the representation, the segments of the respective contiguous sequence of segments having identical durations, each of the SegmentTimeline S sub-elements including data representing a start time and duration for the respective contiguous sequence of segments, at least one of the SegmentTimeline S sub-elements including:
- a respective @t attribute specifying a start time of a first segment of the respective contiguous sequence of segments,
- a respective @k attribute specifying a number of segments in the respective contiguous sequence of segments having identical durations,
- a respective @n attribute specifying a segment number of the first segment of the respective contiguous sequence of segments,
- a respective @d attribute specifying a duration for the respective contiguous sequence of segments such that the identical durations of the segments in the respective contiguous sequence of segments is equal to the value of the respective @d attribute divided by the value of the respective @k attribute, and
- a respective @r attribute specifying a repeat count of a number of contiguous segments or segment sequences following the respective contiguous sequence of segments that have a duration that is the same as the value of the respective @d attribute, each of the segments in each of the contiguous sequences of segments comprising a respective independently retrievable media file having a respective unique uniform resource locator (URL);

determine an identifier for one of the segments using the data indicating the number of segments in the contiguous sequence of segments; and send a request specifying the identifier for the one of the segments to a server device.

31. The non-transitory, computer-readable storage medium of claim 30, wherein the instructions that cause the processor to determine the identifier for the one of the segments comprise instructions that cause the processor to determine the identifier according to a numbering template for the segments.

32. The non-transitory, computer-readable storage medium of claim 30, wherein the instructions that cause the processor to determine the identifier for the one of the segments comprise instructions that cause the processor to determine the identifier according to a hierarchical addressing scheme.

33. The non-transitory, computer-readable storage medium of claim 32, wherein the hierarchical addressing scheme specifies a first part and a second part for the identifier.

34. The non-transitory, computer-readable storage medium of claim 33, wherein the first part specifies a numeric identifier for the segment.

35. The non-transitory, computer-readable storage medium of claim 33, wherein the first part specifies timing information for the segment.

36. The non-transitory, computer-readable storage medium of claim 35, wherein the timing information indicates a playback time at which the segment is to begin being played.

37. The non-transitory, computer-readable storage medium of claim 33, wherein the second part specifies an ordinal identifier of the one of the segments.

38. The non-transitory, computer-readable storage medium of claim 30, wherein the instructions that cause the processor to send the request comprise instructions that cause the processor to send one of a HyperText Transfer Protocol (HTTP) GET request or an HTTP partial GET request.

39. The non-transitory, computer-readable storage medium of claim 30, further comprising instructions that cause the processor to determine the URLs of the segments in the contiguous sequence of segments according to a URL template.

40. The non-transitory, computer-readable storage medium of claim 30, wherein the manifest file does not express exact segment durations for the segments in the contiguous sequence of segments.

41. The non-transitory, computer-readable storage medium of claim 30, wherein the instructions that cause the processor to determine the identifier comprise instructions that cause the processor to determine the identifier without determining durations for the segments in the contiguous sequence of segments.

42. The non-transitory, computer-readable storage medium of claim 30, further comprising instructions that cause the processor to determine segment availability start times for the segments in the contiguous sequence of segments using the values of the @t attributes, the @d attributes, and the @k attributes, wherein the instructions that cause the processor to send the request for the one of the segments comprise instructions that cause the processor to send the request no sooner than a determined availability start time for the one of the segments.

43. The non-transitory, computer-readable storage medium of claim 30, further comprising instructions that cause the processor to:
- determine the duration for the contiguous sequence of segments from the manifest file; and
- divide the duration by the number of segments in the contiguous sequence of segments to determine duration values for the segments in the contiguous sequence of segments.

44. A method of sending media data, the method comprising:
- generating a manifest file including a SegmentTimeline element for a representation of media data, the SegmentTimeline element including a plurality of SegmentTimeline S sub-elements, each of the SegmentTimeline S sub-elements corresponding to a respective contiguous sequence of segments of the representation, the segments of the respective contiguous sequence of segments having identical durations, each of the SegmentTimeline S sub-elements including data representing a start time and duration for the respective contiguous sequence of segments, at least one of the SegmentTimeline S sub-elements including:
  - a respective @t attribute specifying a start time of a first segment of the respective contiguous sequence of segments,
  - a respective @k attribute specifying a number of segments in the respective contiguous sequence of segments having identical durations,
  - a respective @n attribute specifying a segment number of the first segment of the respective contiguous sequence of segments,
  - a respective @d attribute specifying a duration for the respective contiguous sequence of segments such that the identical durations of the segments in the respective contiguous sequence of segments is equal to the value of the respective @d attribute divided by the value of the respective @k attribute, and a respective @r attribute specifying a repeat count of a number of contiguous segments or segment sequences following the respective contiguous sequence of segments that have a duration that is the same as the value of the respective @d attribute, each of the segments in each of the contiguous sequences of segments comprising a respective independently retrievable media file having a respective unique uniform resource locator (URL);

sending the manifest file to a client device;

receiving a request specifying an identifier for one of the segments from the client device; and sending the requested one of the segments indicated by the identifier to the client device in response to the request.

45. The method of claim 44, further comprising sending data defining a numbering template for the segments to the client device to cause the client device to use the numbering template to determine the identifier for the one of the segments.

46. The method of claim 44, further comprising sending data defining a hierarchical addressing scheme to the client device to cause the client device to determine the identifier for the one of the segments according to the hierarchical addressing scheme.

47. The method of claim 46, wherein the hierarchical addressing scheme specifies a first part and a second part for the identifier.

48. The method of claim 47, wherein the first part specifies a numeric identifier for the segment.

49. The method of claim 47, wherein the first part specifies timing information for the segment, wherein the timing information indicates a playback time at which the segment is to begin being played.

50. The method of claim 47, wherein the second part specifies an ordinal identifier of the one of the segments.

51. A server device for sending media data, the server device comprising:

a memory configured to store a manifest file and the media data; and one or more processors implemented in circuitry and configured to:

generate the manifest file to include a SegmentTimeline element for a representation of media data, the SegmentTimeline element including a plurality of SegmentTimeline S sub-elements, each of the SegmentTimeline S sub-elements corresponding to a respective contiguous sequence of segments of the representation, the segments of the respective contiguous sequence of segments having identical durations, each of the SegmentTimeline S sub-elements including data representing a start time and duration for the respective contiguous sequence of segments, at least one of the SegmentTimeline S sub-elements including:

a respective @t attribute specifying a start time of a first segment of the respective contiguous sequence of segments, a respective @k attribute specifying a number of segments in the respective contiguous sequence of segments having identical durations, a respective @n attribute specifying a segment number of the first segment of the respective contiguous sequence of segments, a respective @d attribute specifying a duration for the respective contiguous sequence of segments such that the identical durations of the segments in the respective contiguous sequence of segments is equal to the value of the respective @d attribute divided by the value of the respective @k attribute, and a respective @r attribute specifying a repeat count of a number of contiguous segments or segment sequences following the respective contiguous sequence of segments that have a duration that is the same as the value of the respective @d attribute, each of the segments in each of the contiguous sequences of segments comprising a respective independently retrievable media file having a respective unique uniform resource locator (URL);

send the manifest file to a client device;

receive a request specifying an identifier for one of the segments from the client device; and send the requested one of the segments indicated by the identifier to the client device in response to the request.

52. The device of claim 51, wherein the one or more processors are configured to send data defining a numbering template for the segments to the client device to cause the client device to use the numbering template to determine the identifier for the one of the segments.

53. The device of claim 51, wherein the one or more processors are configured to send data defining a hierarchical addressing scheme to the client device to cause the client device to determine the identifier for the one of the segments according to the hierarchical addressing scheme.

54. The device of claim 53, wherein the hierarchical addressing scheme specifies a first part and a second part for the identifier.

55. The device of claim 54, wherein the first part specifies a numeric identifier for the segment.

56. The device of claim 54, wherein the first part specifies timing information for the segment, wherein the timing information indicates a playback time at which the segment is to begin being played.

57. The device of claim 54, wherein the second part specifies an ordinal identifier of the one of the segments.

* * * * *